United States Patent [19]

Stromberg

[11] 3,950,555

[45] Apr. 13, 1976

[54] METHOD OF TENDERIZING AND IMPROVING THE FLAVOR OF FOOD

[76] Inventor: Bengt Stromberg, Hastholmsvagen 23, Stockholm So, Sweden

[22] Filed: June 15, 1971

[21] Appl. No.: 153,398

Related U.S. Application Data

[63] Continuation of Ser. No. 812,401, April 1, 1969, abandoned.

[30] Foreign Application Priority Data

Apr. 1, 1968 Sweden.............................. 4292/68

[52] U.S. Cl. ............... 426/281; 426/641; 426/644; 426/647; 426/650; 426/652
[51] Int. Cl.² ......................................... A23L 1/31
[58] Field of Search ............. 99/107, 159, 222, 21; 426/281, 641, 644, 647, 650, 652

[56] References Cited
UNITED STATES PATENTS

| | | |
|---|---|---|
| 1,113,021 | 10/1914 | Krause.............................. 99/21 X |
| 2,021,621 | 11/1935 | Allen et al. ........................ 99/107 X |
| 2,241,868 | 5/1941 | Reimann.............................. 99/21 X |
| 2,968,569 | 1/1961 | Seharf............................... 99/107 X |
| 3,449,124 | 6/1969 | Lipner .............................. 99/107 X |

*Primary Examiner*—Raymond N. Jones
*Attorney, Agent, or Firm*—Eric Y. Munson

[57] ABSTRACT

A preparation comprising a mixture of blood serum powder from cattle, aroma giving agents and water is applied to food such as slaughtered poultry, game and other meats for the purpose of tenderizing and improving the flavor of the food. The blood serum powder from cattle is used in combination with various aroma giving agents selected from the group consisting of sodium glutamate, mineral salts, onion, flavoring and mixtures thereof in one specific embodiment. The mixture may be applied to the food by injection or pickling thereby inherently causing the absorption of the tenderizing preparation therein.

2 Claims, No Drawings

METHOD OF TENDERIZING AND IMPROVING THE FLAVOR OF FOOD

RELATED APPLICATION

This application is a continuation of the parent U.S. application Ser. No. 812,401 filed Apr. 1, 1969 now abandoned by the same inventor.

BACKGROUND OF THE INVENTION

The meat of a newly slaughtered animal is very often tough and is only fit for making bouillons, farcemeat and sausages. There are several prior art methods for treating slaughtered poultry, game and other meats to make them more tender and appetizing to the taste. Two of these prior art methods include the so-called hanging procedure and a special radiation procedure. The hanging procedure is basically an aging process. Before the meat is to be sold, it has to be hung for a period of time for maturing. During the hanging period, the meat becomes more tender, gets a darker color and becomes richer in flavor substances.

The meat becomes more tender in the hanging process because the albumen and the connective tissue in the meat is mellowed through the action of enzymes. The prior art hanging period varies according to the type of meat, temperature and method of application. The lower the hanging temperature, the longer the maturing period. The article must hang for about 2 to 3 weeks before it becomes tender and appetizing. During this period, the article decreases in weight by about 5 to 10%. If it has become moldy, it must also be trimmed. The prior art hanging procedure as applied to a large number of carcasses necessarily requires a relatively large store room.

In a specific prior art process, a fattened chicken usually referred to as a broiler is treated in the following manner. A live broiler is hung by its feet on a conveyor belt. An electric slaughtering tool is used to slaughter the broiler and the chicken is stuck or cut to allow the blood to drain off. The slaughtered broiler is then taken to a scalding tank. The distance between the sticking or cutting of the broiler and the scalding tank is regulated in such a way as to make all the blood drain off before the bird reaches the scalding tank. The water in the scalding tank is about 58°C. If there is still blood left in the bird, it must be rejected because the blood will coagulate at the temperature of the scalding tank and will cause the body of the bird to become red streaked. The feathers of the bird are plucked and it is cleaned immediately after removal from the scalding tank. The plucked and cleaned body is then passed through a water bath for cooling and washing.

Such a prior art treatment takes considerable amount of time. Furthermore, there is the loss of valuable albuminous substances because the poultry body is hollow thereby allowing any water to wash therethrough once the insides have been completely removed.

In the prior art special radiation procedure, the treating of slaughtered poultry, game and other meats is accomplished more quickly than the prior art hanging procedure. However, the radiation procedure requires expensive apparatus that is extremely large and complicated.

PURPOSE OF THE INVENTION

The purpose of this invention is to eliminate the disadvantages associated with the prior art procedures and to produce slaughtered poultry, game and other meats that are tender and have a much improved flavor when compared with meats treated in accordance with the prior art.

Another object of this invention is to provide a preparation used for treating slaughtered meat which takes immediate effect after it has been applied thereto.

A still further object of this invention is to effect a tenderizing and an improved flavor by treating meat in a short period of time in accordance with this invention.

A still further object of this invention is to provide a composition which may be used to treat slaughtered poultry products which are produced in large quantities.

SUMMARY OF THE INVENTION

It has been discovered that blood serum powder from cattle may be used in combination with aroma giving agents such as sodium glutamate, onion, mineral salts and flavoring to effectuate the tenderizing of slaughtered meats and provide an improved flavor therein. The blood serum powder is generally referred to as "Plasmavita (serum white)". More specifically, the product used in this invention is "CPa Plasmavita-Plenora Fridmans Karlstad". The blood of cattle is treated in such a way as to liberate the red blood corpuscles from the white corpuscles and the colorless or lightly yellow colored strongly aqueous serum. The desired separation is carried on through prior art methods of centrifuging. While it is known to use the separated blood hemoglobin containing the red corpuscles in the prior art, there has been no specific use of the white blood serum as discovered by the applicant.

The blood serum with the white corpuscles is spray dried to form a powder. The starting temperature in the spray drying apparatus is about 150°C. The entire operation for the production of the blood serum powder is done in a closed system. The blood serum powder is neither a single protein or a hydrolized one without the colorless or lightly yellow colored fluid in which the white blood corpuscles are found. As is known in the prior art, agents such as sodium nitrate are added to the blood before centrifuging to prevent the coagulation of the blood.

The method of this invention comprises the steps of blending a mixture of the blood serum powder from cattle, aroma giving agents and water in proportions effective to produce tender meat and improve the flavor thereof and applying the mixture to the food to be treated. The aroma giving agents are selected from the group consisting of sodium glutamate, mineral salts, onion, flavoring and mixtures thereof. The aroma giving agents have been found to be capable of giving the slaughtered meat a taste which is comparable to the taste of meat treated by the prior art hanging procedure.

A specific preparation of this invention includes a mixture of a concentrate and water in the relation of 18 parts by weight of the concentrate to 100 parts by weight of water. The concentrate comprises a mixture of 1 part by weight of solid ingredients and 2 parts by weight water. The solid ingredients include blood serum powder from cattle and aroma giving agents in amounts effective to tenderize and improve the flavor of the food. In a more specific embodiment, there are 1 to 10 parts by weight of the blood serum powder and 3.9–29 parts by weight of the aroma giving agents. In a more specific embodiment, the aroma giving agents are present in the amounts of 0.4–6 parts by weight sodium glutamate, 2–11 parts by weight mineral salts, 1-6 parts by weight onion and 0.5–6 parts by weight flavoring. The flavoring used can be any of the well known prior art flavorings which are available to the skilled artisan. Any prior art method of applying preparations such as injection or pickling the material in the composition thereby inherently causing absorption of the composition therein may be used in conjunction with this invention.

The ingredients as set forth hereinabove have been approved by the Royal Swedish Board of Commerce according to the Code of Statutes thereof 1967 No. 4 Ser. A, and the raw material according to Swedish legislation respecting food.

SPECIFIC EXAMPLES

The following examples demonstrate the use of the various ingredients in accordance with the preparation of this invention and show the relationship in terms of parts by weight.

Example I

The following ingredients were placed in a mixing machine running at a high rate of speed:

0.52 Kg sodium glutamate
0.90 Kg blood serum powder from cattle
0.95 Kg sodium chloride
0.27 Kg onion
0.36 Kg flavoring
6 liters of water The resultant concentrate of the above ingredients was then added in the following proportions to water:

9.0 Kg concentrate
50 liters of water

The mixture added with water was then introduced into a broiler representing a slaughtered poultry product. The broiler was usable immediately for any further treatment. After this rapid treatment, a tender and appetizing product was obtained.

Example II

The following mixture was placed in a mixing machine running at a high rate of speed as in Example I:

1.0 Kg sodium glutamate
1.7 Kg blood serum powder from cattle
1.8 Kg sodium chloride
0.7 Kg onion
0.8 Kg flavoring
12 liters of water The mixture resulted in a concentrate which was mixed with additional amounts of water as follows:

18 Kg concentrate
100 liters of water

A cleaned slaughtered broiler was placed in the water and pickled therein to effect the absorption of the ingredients in the mixture. After this rapid treatment, a very tender and appetizing product was obtained.

ADVANTAGES OF THE INVENTION

The use of the composition made in accordance with this invention does not require a large amount of space such as is required in the prior art hanging procedures. An article such as slaughtered poultry, game and meat treated in accordance with this invention decreased very little in weight. For example, in using the composition in accordance with this invention, the percentage of decreased weight is only about 13 to 15% as compared to about 28 to 30% decreased weight when the composition is not used.

In addition, less of the juice drains off of the meat when the composition is employed which of course emphasizes the characteristic flavor substances of the article. It has been found that the particular properties of the blood serum powder may cause the preparation made in accordance with this invention to penetrate easily into the meat and effect uniform distribution therein. In other words, it is indicated that the blood serum powder serves as a carrier for the aroma giving agents to effect the desired results of this invention. Such a use of white blood serum powder has not been effected in the prior art.

While the method for producing a composition which through an injection into the slaughtered meat of poultry or game and the like makes the meat tender and appetizing has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. A method of tenderizing and improving the flavor of slaughtered animal food comprising:
    a. blending by stirring a mixture of 0.4–6 parts by weight sodim glutamate, 1–10 parts by weight blood serum powder from cattle, 2–11 parts by weight sodium chloride, 1–6 parts by weight onion, 0.5–6 parts by weight flavoring and balance water in the relation of 1 part by weight of said solid ingredients and 2 parts by weight water to form a concentrate, and
    b. mixing said concentrate with the relationship of 18 parts by weight of concentrate to 100 parts by weight of water, and
    c. applying the mixture to the food to be treated.

2. A preparation for tenderizing and improving the flavor of slaughtered animal food comprising: a mixture of 0.4–6 parts by weight sodium glutamate, 1–10 parts by weight blood serum powder from cattle, 2–11 parts by weight sodium chloride, 1–6 parts by weight onion, 0.5–6 parts by weight flavoring and water in the relation of 1 part by weight of said solid ingredients and 2 parts by weight water to form a concentrate, said concentrate being mixed with water in the relation of 18 parts by weight of concentrate to 100 parts by weight of water.

* * * * *